(12) United States Patent
Chen

(10) Patent No.: US 8,322,357 B2
(45) Date of Patent: Dec. 4, 2012

(54) INTEGRITY PROTECTION FOR PRESSURIZED BI-DIRECTIONAL SYSTEMS

(75) Inventor: Jerry Chen, Orange, CA (US)

(73) Assignee: Quantum Fuel Systems Technologies Worldwide, Inc., Troy, MI (US)

( * ) Notice: Subject to any disclaimer, the term of this patent is extended or adjusted under 35 U.S.C. 154(b) by 601 days.

(21) Appl. No.: 12/618,651

(22) Filed: Nov. 13, 2009

(65) Prior Publication Data
US 2011/0114194 A1    May 19, 2011

(51) Int. Cl.
*F17C 5/06* (2006.01)
*G05D 7/00* (2006.01)

(52) U.S. Cl. ............... 137/14; 137/505; 137/599.03; 137/599.08; 137/599.09

(58) Field of Classification Search ............ 137/14, 137/505, 624.12, 624.18, 599.01, 599.03, 137/599.08, 599.09
See application file for complete search history.

(56) References Cited

U.S. PATENT DOCUMENTS

| 5,454,408 | A | * | 10/1995 | DiBella et al. | ............. 141/197 |
| 6,260,568 | B1 | * | 7/2001 | Hsu et al. | ............ 137/599.09 |
| 7,309,113 | B2 | * | 12/2007 | Carter | ............. 137/505 |
| 8,215,331 | B2 | * | 7/2012 | Chen | ............. 137/14 |

* cited by examiner

*Primary Examiner* — Kevin Lee
(74) *Attorney, Agent, or Firm* — Baker Hostetler, LLP; Mark H. Krietzman

(57) ABSTRACT

Excess flow valve devices, which are responsive to pressure and flow conditions in a bi-directional system, including structures to restrict flow in one direction through openings of a stopper of an excess flow valve based on balancing forces from at least a spring and a frictional force caused by the flow. Bi-directional system employing at least one pressure delayer responsive to pressure and flow impulses to protect a tank valve of a storage tank or a regulator during a refill phase or a discharge phase.

19 Claims, 10 Drawing Sheets

US 8,322,357 B2

INTEGRITY PROTECTION FOR PRESSURIZED BI-DIRECTIONAL SYSTEMS

BACKGROUND

Field

Figure 1:
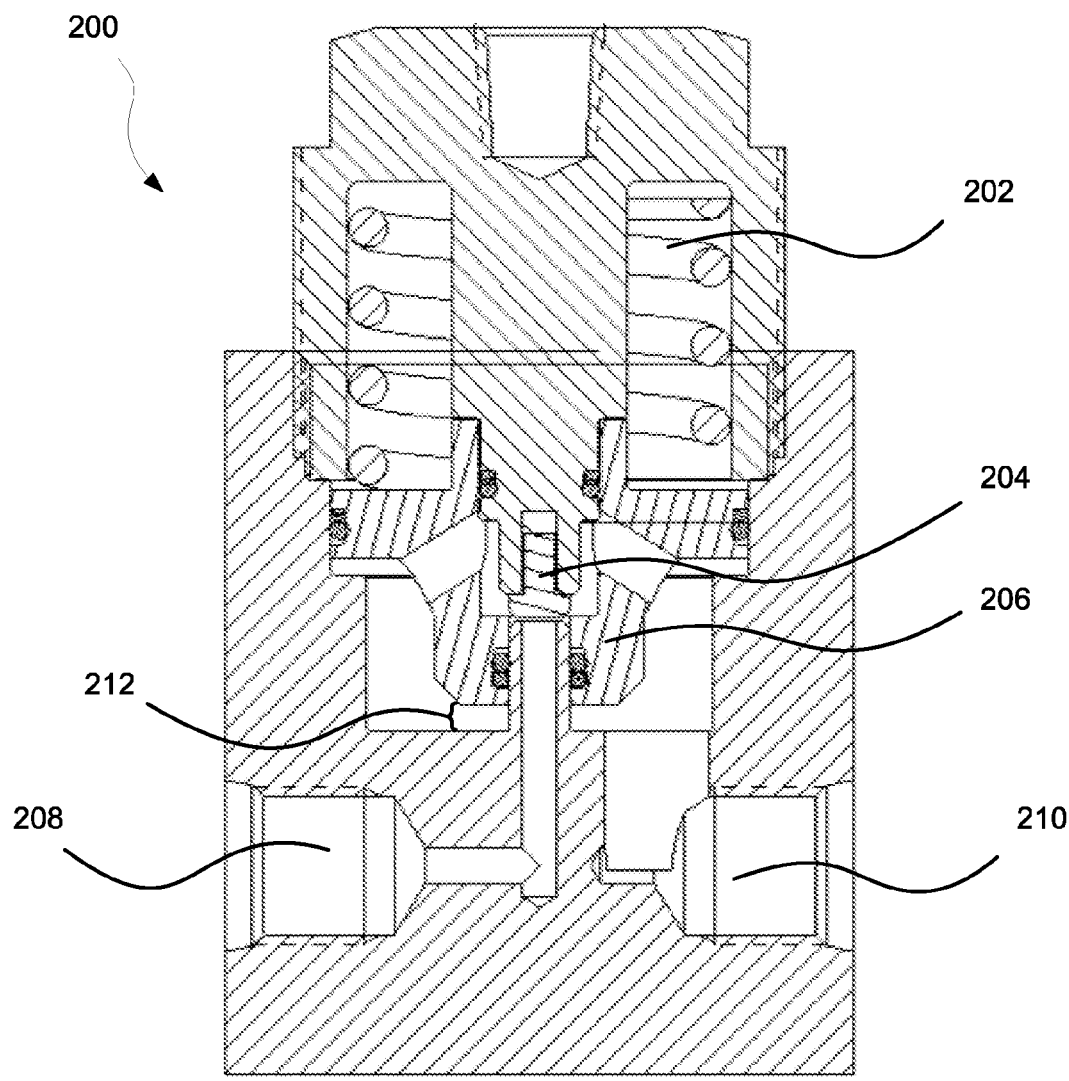

This disclosure relates to devices and systems for managing pressure conditions in a bi-directional fluid conduction system and more specifically in a system with gaseous fluids.

SUMMARY

According to aspects of at least one exemplary implementation, a bi-directional system is disclosed herein, comprising: a storage tank source; a regulator; a spending line connecting the storage tank to the regulator; a fill line connected to the spending line; a check valve between the storage tank and the fill line and configured to allow flow into the storage tank; and a tank valve between the storage tank and the fill line and in parallel with the check valve.

According to aspects of at least one exemplary implementation, the bi-directional system may further comprise a distal pressure delayer having an inlet connected to the fill line and an outlet connected to the tank valve. The distal pressure delayer may be configured to delay a flow of fluid through the distal pressure delayer when a flow impulse is provided to the inlet of the distal pressure delayer.

According to aspects of at least one exemplary implementation, the bi-directional system may further comprise an output pressure delayer having an inlet connected to the tank valve and an outlet connected to the regulator. The output pressure delayer may be configured to delay a flow of fluid through the output pressure delayer when a flow impulse is provided to the inlet of the output pressure delayer.

According to aspects of at least one exemplary implementation, the bi-directional system may further comprise a proximal pressure delayer valve having an inlet connected to the storage tank and an outlet connected to the tank valve. The proximal pressure delayer may be configured to delay a flow of fluid through the proximal pressure delayer when a flow impulse is provided to the inlet of the proximal pressure delayer.

According to aspects of at least one exemplary implementation, a method of controlling fluid flow is disclosed herein, comprising: during a refill phase, receiving a first flow impulse of a fluid from a fill line to a bi-directional spending line, whereby the first flow impulse is directed toward a tank valve of a storage tank and a regulator connected by the spending line; delaying the first flow impulse to the tank valve, wherein the tank valve is disposed between the fill line and a storage tank, whereby the fluid is substantially directed to the storage tank through a check valve connected to the storage tank in parallel with the tank valve; and delaying the first flow impulse to the regulator, whereby leakage of the regulator during the refill phase is reduced.

Delaying the first flow impulse to the tank valve may comprise reducing a flow path in a distal pressure delayer in response to friction in the distal pressure delayer caused by the first flow impulse. Delaying the first flow impulse to the regulator may comprise reducing a flow path in an output pressure delayer in response to friction in the output pressure delayer caused by the first flow impulse.

The method may further comprise: during a discharge phase, receiving a second flow impulse from the storage tank to the spending line; and delaying the second flow impulse to the regulator, whereby leakage of the regulator during the discharge phase is reduced. Delaying the second flow impulse to the regulator may comprise reducing a flow path in an output pressure delayer in response to friction in an output pressure delayer caused by the second flow impulse.

DRAWINGS

Figure 2:
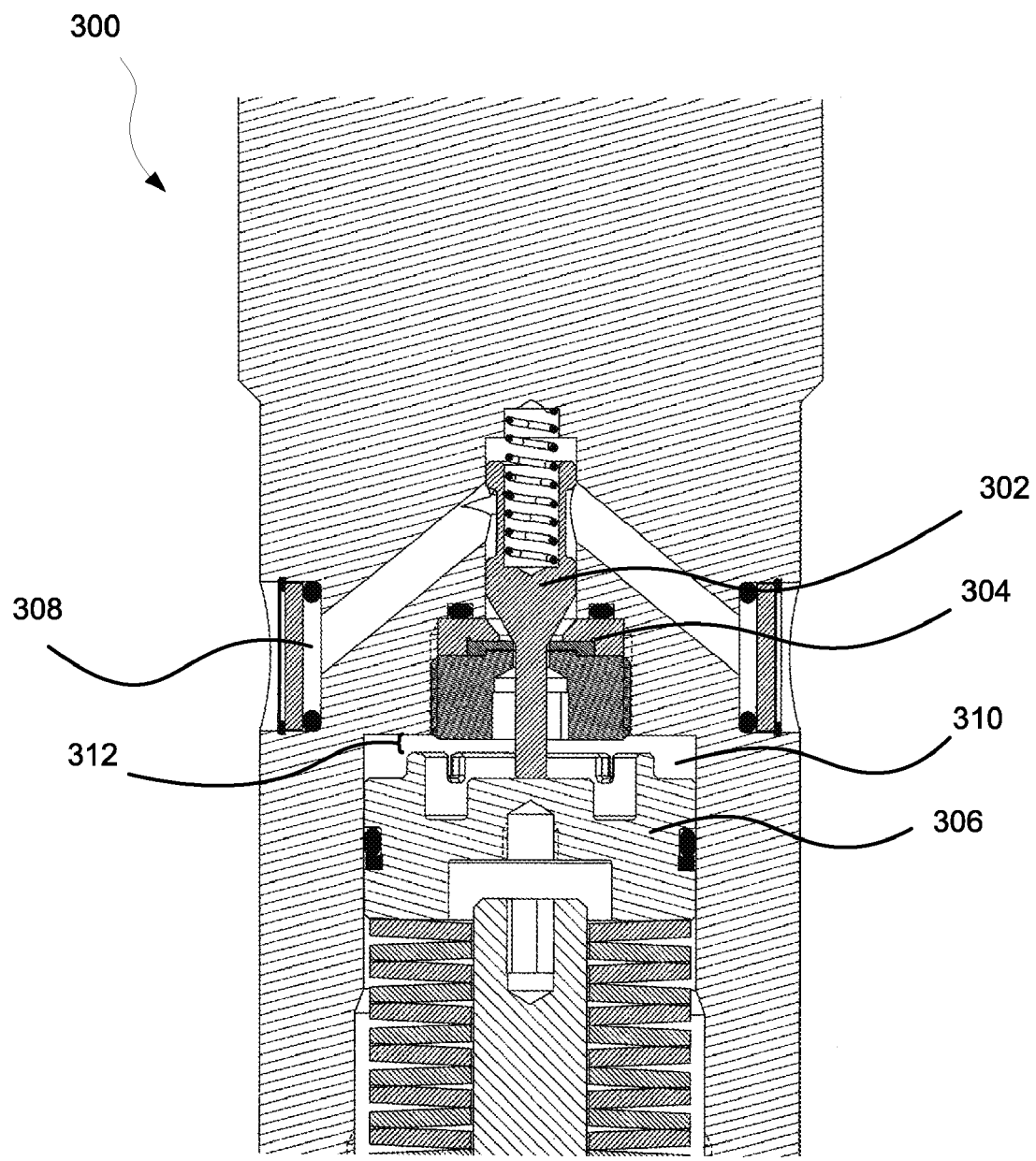
Figure 3:
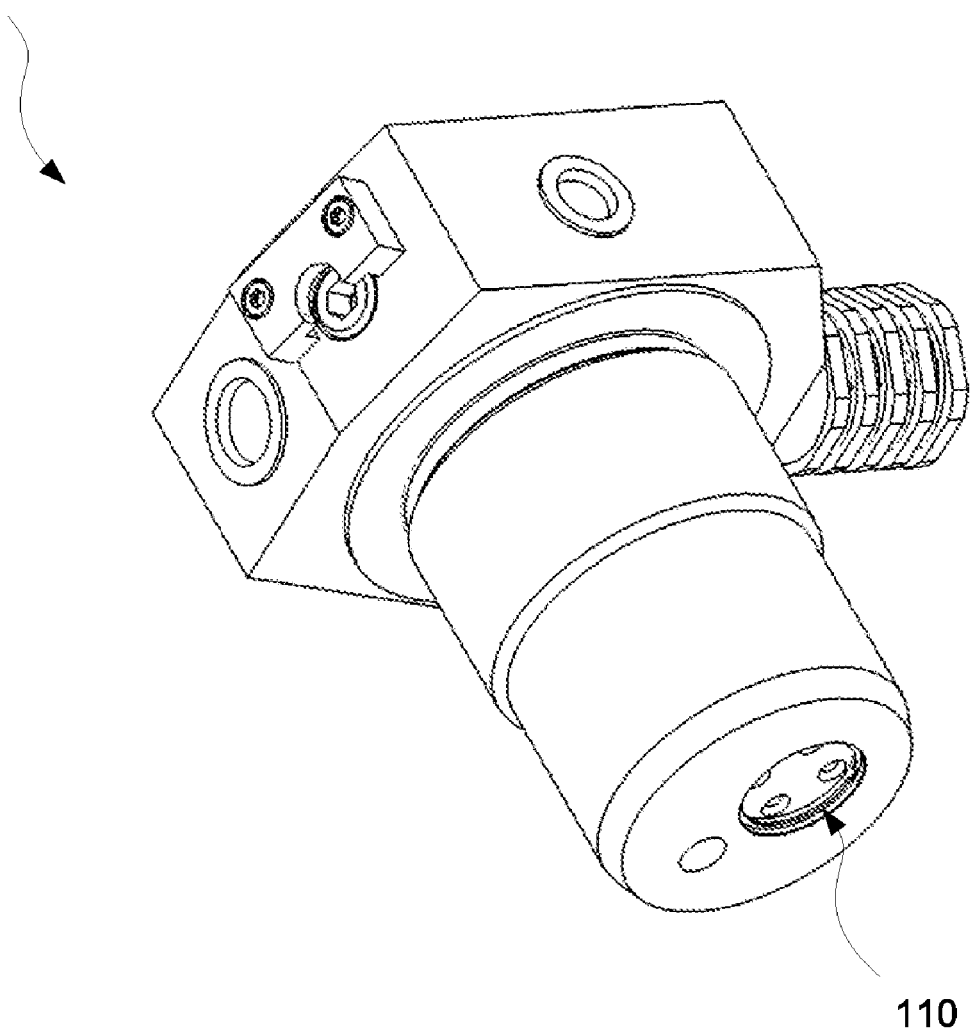
Figure 4:
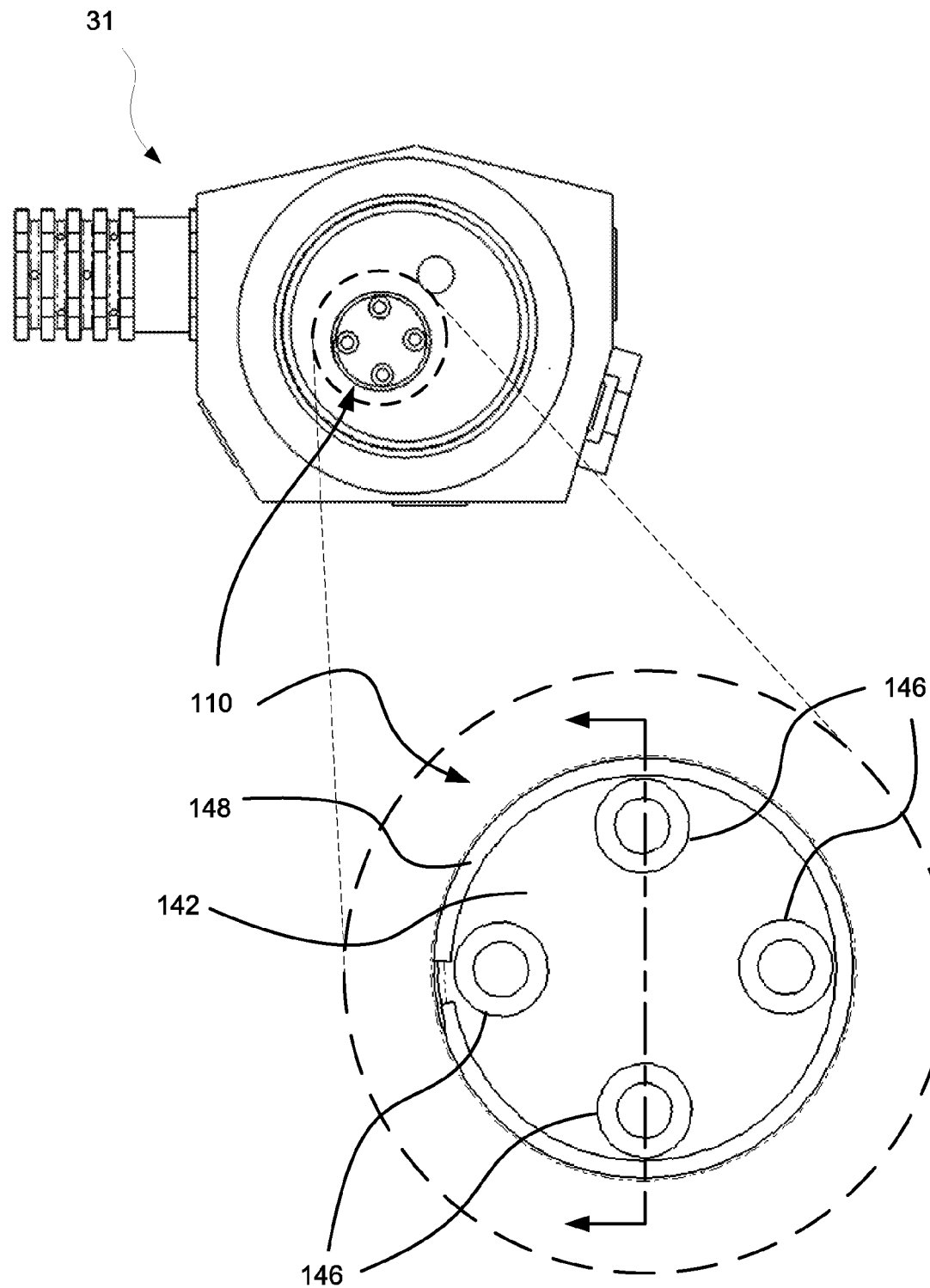
Figure 5:
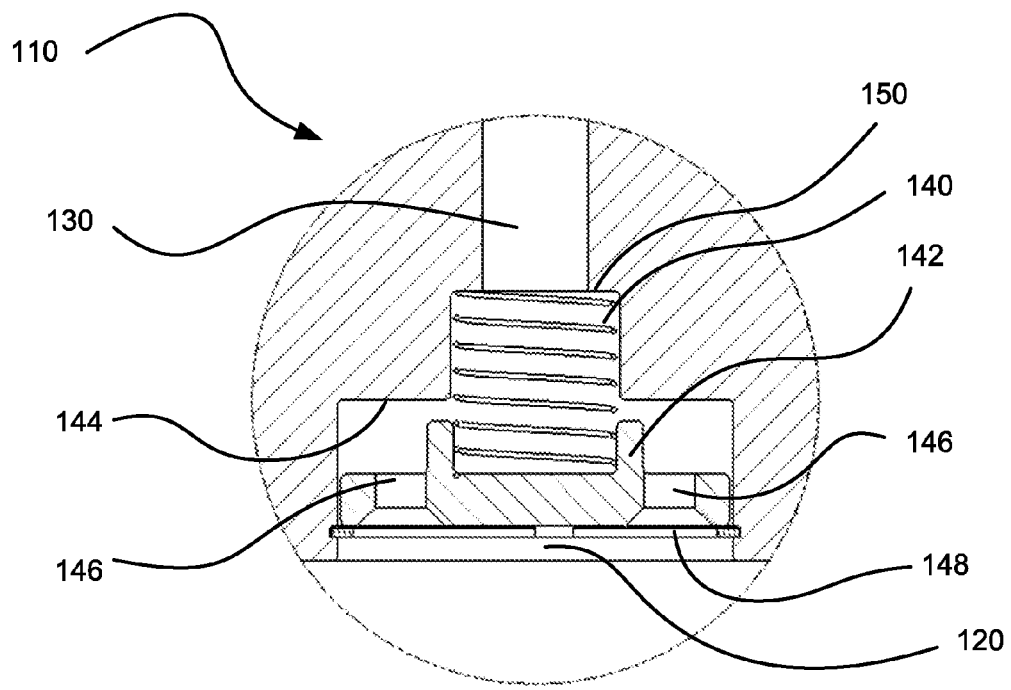
Figure 6:
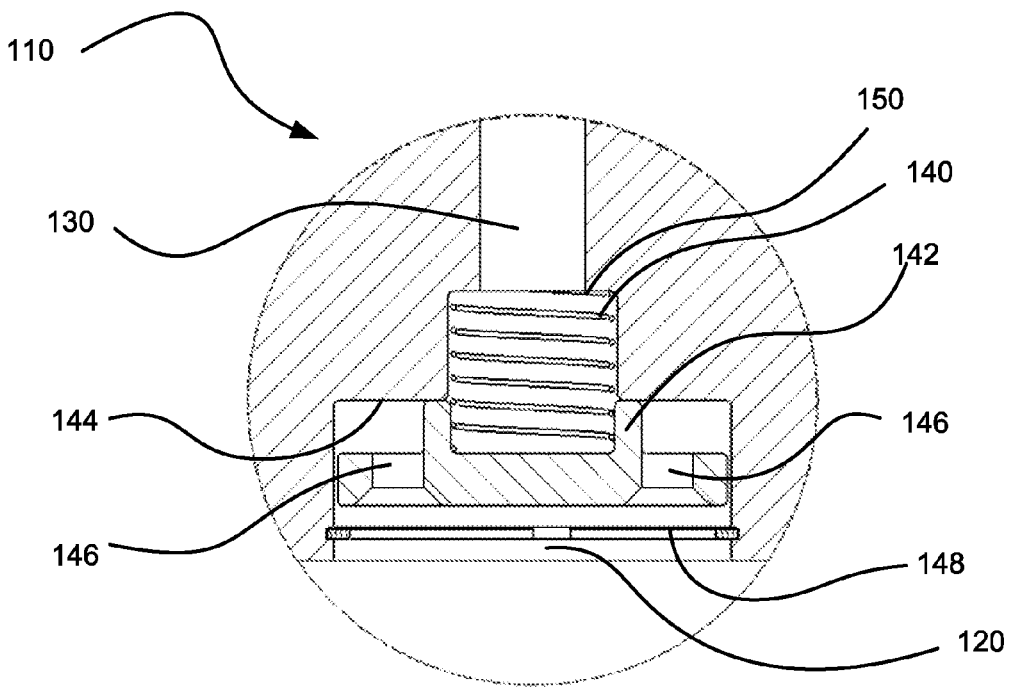
Figure 7:
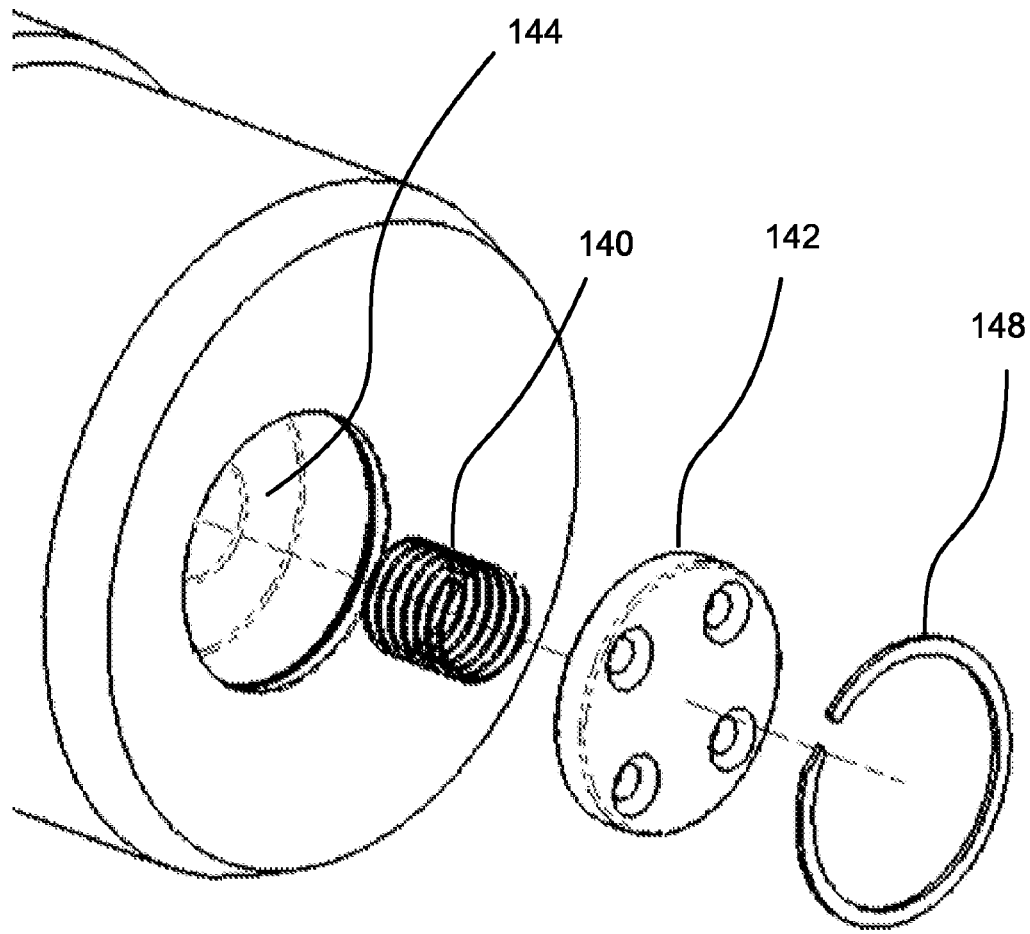
Figure 8:
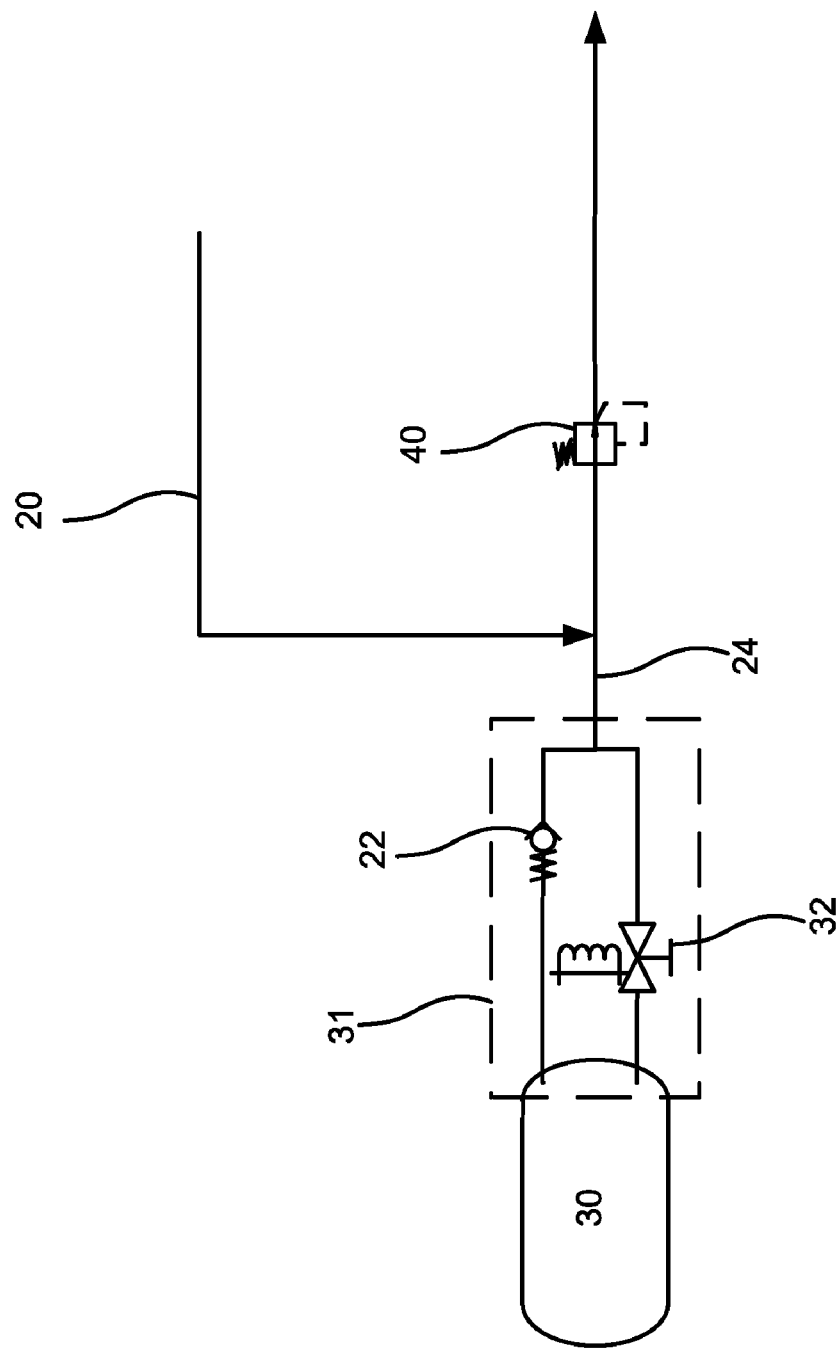
Figure 9:
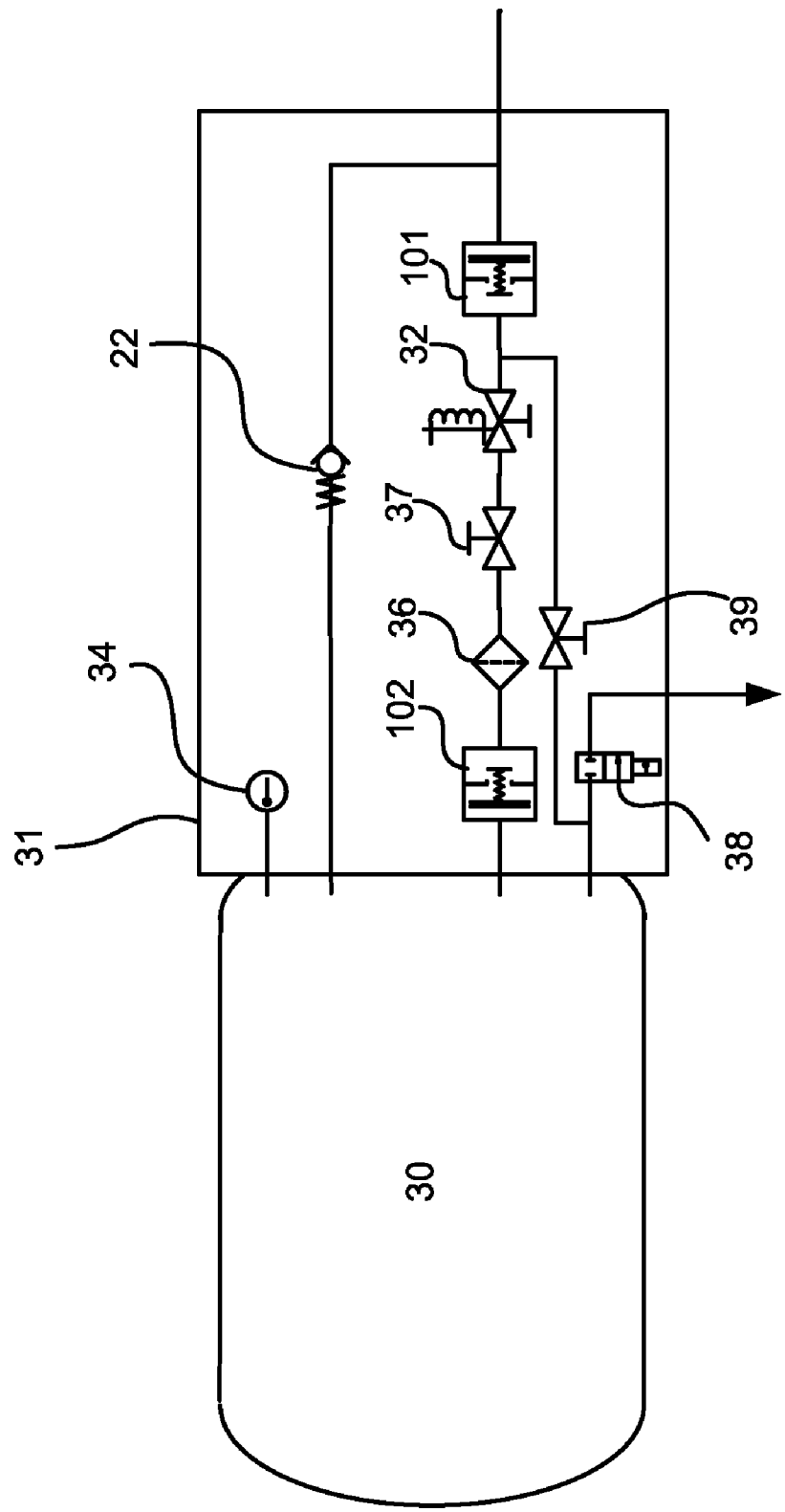
Figure 10:
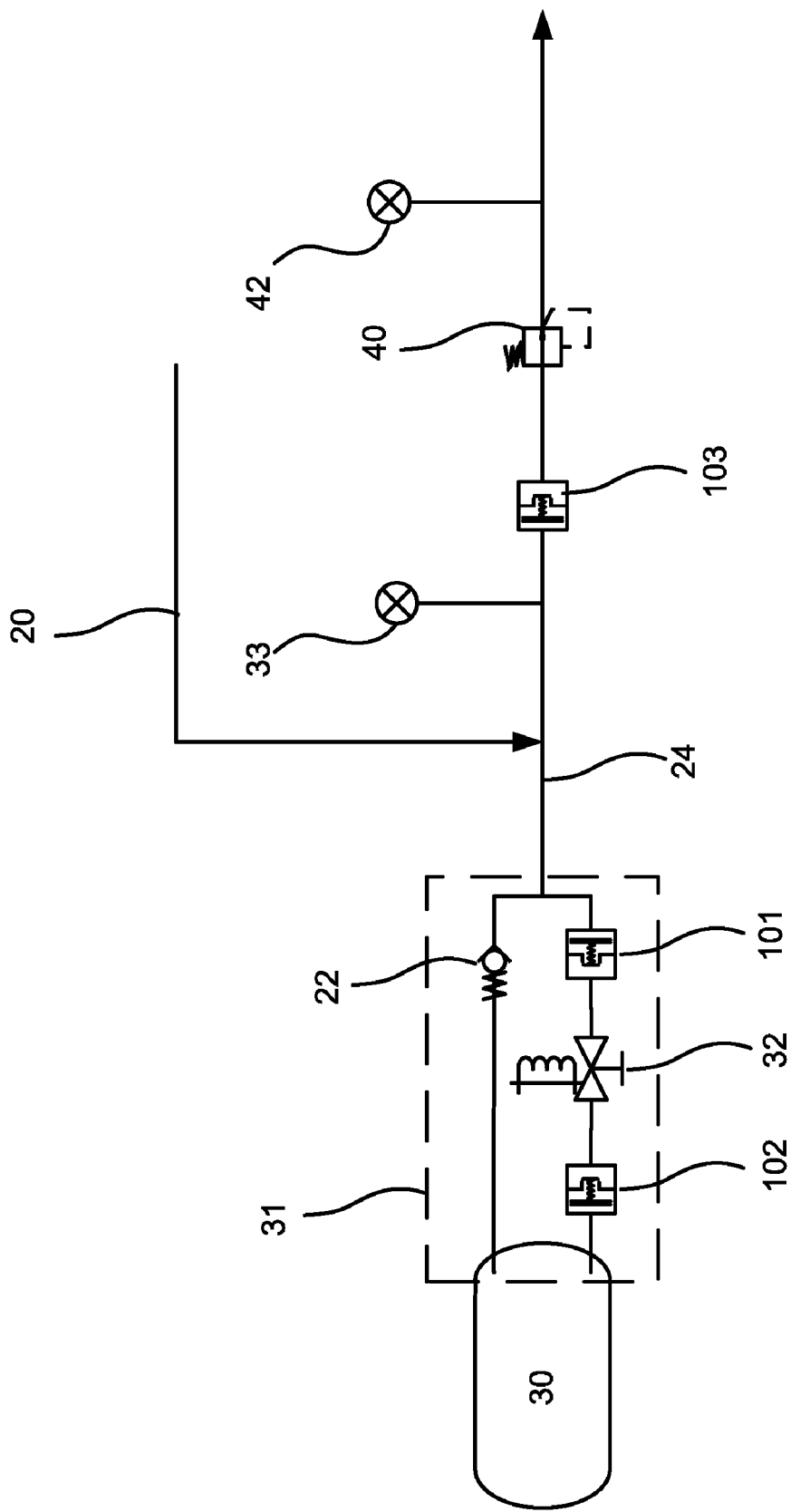
Figure 11:
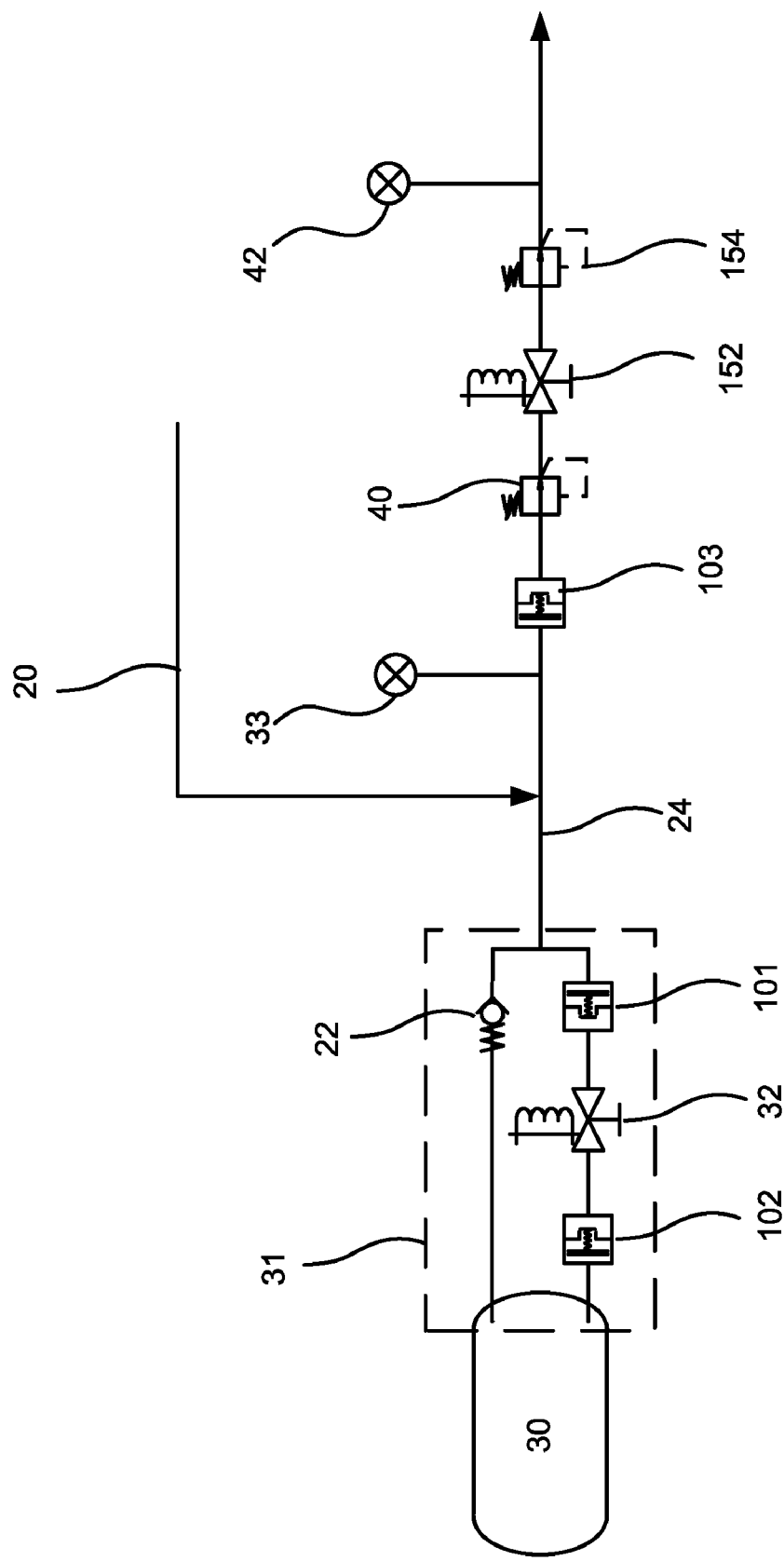

The above-mentioned features and objects of the present disclosure will become more apparent with reference to the following description taken in conjunction with the accompanying drawings wherein like reference numerals denote like elements and in which:

FIG. 1 shows a cross-sectional view of a regulator;
FIG. 2 shows a cross-sectional view of a regulator;
FIG. 3 shows a perspective view of an active on tank valve with excess flow valve;
FIG. 4 shows a side view of an active on tank valve with excess flow valve;
FIG. 5 shows a cross-sectional view of an excess flow valve in an open state;
FIG. 6 shows a cross-sectional view of an excess flow valve in a closed state;
FIG. 7 shows an exploded view of an excess flow valve;
FIG. 8 shows a schematic diagram of a system;
FIG. 9 shows a storage tank with an active on tank device;
FIG. 10 shows a schematic diagram of a system; and
FIG. 11 shows a schematic diagram of a system.

DETAILED DESCRIPTION

According to aspects of at least one exemplary implementation, a pressure delayer may, in some instances, be particularly important to protect impact of components elsewhere in a system that respond or are resistant to sudden and rapid changes in pressure.

FIG. 1 shows a regulator 200 having piston 206, seat 204, and spring 202. Inlet 208 and outlet 210 are also provided. Regulator 200 is shown in a closed position with piston 206 in contact with seat 204. Spring 202 may help effectuate the closed position. Regulator 200 may be configured to close when the pressure at outlet 210 is higher than the given pressure, whereby piston 206 moves across travel distance 212. Upon such a condition, the gap between seat 204 and piston 206 will close. Regulator 200 may be configured to open when the pressure at outlet 210 is lower than a given pressure (e.g., 0.9 Mpa), according to the spring 202. Upon such a condition, the gap between seat 204 and piston 206 will open. If sudden increase of the pressure occurs at inlet 208, the flow will travel from inlet 208, across the gap, and cause a rapid increase of pressure at outlet 210. This sudden increase of pressure will cause piston 206 to impound on seat 204. The force of impact between piston 206 and seat 204 can be high enough to damage seat 204, which may be of a soft material, such as plastic or rubber, to provide effective sealing against piston 206. For example, in many instances this force may exceed about 100 lbs., in some instances the force may be below about 300 lbs., and in yet other instances the force may exceed about 300 lbs.

FIG. 2 shows another regulator 300 having piston 306, seat 304, and poppet 302. Inlet 308 and outlet 310 are also provided. Seat 304 may be plastic, while poppet 302 and piston 306 may be metal. When outlet 310 experiences a sufficiently low pressure, piston 306 moves along travel distance 312 to cause poppet 302 and seat 304 to be separated in an open state, wherein a fluid path between inlet 308 and outlet 310 is provided. When the pressure at inlet 308 increases, the flow will pass reach outlet 310. The pressure at outlet 310 will push down piston 306 and may cause poppet 302 to achieve a closed state in which poppet 302 is in contact with seat 304. If a fluid passes suddenly through the gap between poppet 302 and seat 304 and enters outlet 310, then piston 306 will be rapidly move away from seat 304, causing poppet 302 to have no support. Thus, poppet 302 will rapidly move toward seat 304 until impact occurs. The force of this impact may cause seat 304 to deform. Thus, seat 304 may be permanently damaged from such conditions and never accomplish effective sealing in normal operation thereafter.

According to aspects of at least one exemplary implementation, excess flow valve ("EFV") 110 is disclosed herein. EFV 110 may be a mechanical valve configured to manage a flow of a fluid across portions thereof.

According to aspects of at least one exemplary implementation, as shown in FIG. 3, EFV 110 may be part of a device with various interconnections and interfaces to operate in conjunction with other components of a system. For example, EFV 110 may be part of an active on tank device 31 configured to manage flow and conditions of storage tank 30 (not shown). According to aspects of at least one exemplary implementation, more than one EFV 110 may be provided as part of or in connection with an active on tank device 31.

According to aspects of at least one exemplary implementation, as shown in FIG. 4, EFV 110 may include stopper 142 configured to interface with at least base 148. Stopper 142 may include at least one opening 146 to allow passage of a fluid through at least a portion of stopper 142.

According to aspects of at least one exemplary implementation, as shown in FIGS. 5 and 6, EFV 110 may include inlet 120 and outlet 130 disposed on opposite sides of stopper 142.

According to aspects of at least one exemplary implementation, as shown in FIGS. 5 and 6, EFV 110 may include spring 140. Spring 140 is configured to provide a force tending to maintain EFV 110 in an open state. For example, as shown in FIG. 5, spring 140 may be attached provide a force between seat 150 and stopper 142, such that stopper 142 is caused to separate from mating surface 144. Spring 140 may be any device that provides variable force based on the extend of compression achieved. For example, spring 140 may be configured to compress when a force from inlet 120 is applied to stopper 142.

According to aspects of at least one exemplary implementation, base 148 may be provided to limit the travel of stopper 142 away from mating surface 144. For example, base 148 may be a ring-like member having an inner diameter that is less than the outer diameter of stopper 142. As shown in FIG. 7, base 148 may be a ring-like member with an incomplete portion to allow radial compression of base 148 during installation.

According to aspects of at least one exemplary implementation, stopper 142 may include at least one opening 146 to allow flow through at least a portion of stopper 142. As shown in FIG. 5, openings 146 may provide at least a portion of a fluid connection between inlet 120 and outlet 130 in an open state. Openings 146 may include any shape or size connection that connects one portion of stopper 142 with another portion of stopper 142. For example, openings may include spaces allowing fluid flow around or through stopper 142.

According to aspects of at least one exemplary implementation, stopper 142 may be configured to interface with mating surface 144 in a closed state and interface with base 148 in an open state. For example, various geometries, which may include but are not limited to substantially flat opposing surfaces, may be provided. According to aspects of at least one exemplary implementation, stopper 142 may have at least a curved portion to interface with a complementary curved portion of mating surface 144. Components of stopper 142, mating surface 144, and base 148 may have at least smoothed or rounded edges to avoid damage in the event of uneven impact. Stopper 142 or mating surface 144 may be of one or more of rigid, semi-rigid, or soft materials according to desired characteristics and interfacing thereof.

According to aspects of at least one exemplary implementation, inlet 120 may have a pressure ($P_i$) therein and a cross-sectional area ($A_i$) corresponding to the surface of stopper 142 facing inlet 120. The cross-sectional area ($A_i$) may consider the geometry of stopper 142. According to aspects of at least one exemplary implementation, outlet 130 may have a pressure ($P_o$) therein and a cross-sectional area ($A_o$) corresponding to the surface of stopper 142 facing outlet 130. The cross-sectional area ($A_o$) may consider the geometry of stopper 142. According to aspects of at least one exemplary implementation, spring 140 may have a variable force ($F_s$) that is exerted on stopper 142.

A force ($F_i$) attributable to pressure conditions in inlet 120 may be expressed as:

$$F_i = P_i * A_i \quad \text{(Formula 1)}.$$

A force ($F_o$) attributable to pressure conditions in outlet 130 may be expressed as:

$$F_o = P_o * A_o \quad \text{(Formula 2)}.$$

Additionally, a frictional force ($F_f$) may arise from flow from inlet 120, through openings 146, or otherwise across stopper 142. According to aspects of at least one exemplary implementation, openings 146 of stopper 142 may be configured (which shall include but is not limited to substrate, lubricity, roughness, surface characteristics, shape, position, orientation) to enable, enhance, or amplify friction (e.g., turbulence, etc.) in response to the flow of a fluid. The frictional force may be a function of the flow rate through openings 146.

In an open state, the force at inlet 120 ($F_i$) and a frictional force ($F_f$) may be less than the combined forces at outlet 130 ($F_o$) and from spring 140 ($F_s$), wherein base 148 provides a force to balance stopper 142. In a closed state, the force at inlet 120 ($F_i$) and a frictional force ($F_f$) may be greater than the combined forces at outlet 130 ($F_o$) and from spring 140 ($F_s$), wherein mating surface 144 provides a force to balance stopper 142. At a transition point between an open state and a closed state, the forces $F_i$, $F_o$, $F_f$, and $F_s$ acting on stopper 142 may be balanced and expressed as:

$$F_i + F_f = F_o + F_s \quad \text{(Formula 3)}.$$

This may be further expressed as:

$$(P_i * A_i) + F_f = (P_o * A_o) + F_s \quad \text{(Formula 4)}.$$

Thus, the pressure conditions at which EFV 110 transitions between open and closed states is determined by the characteristics of spring 140, the geometry of stopper 142 (including openings 146 and portions exposed to each of inlet 120 and outlet 130). Accordingly, features and characteristics of EFV 110 may be selected to cause EFV 110 to be responsive to certain pressure conditions at inlet 120 and outlet 130, providing programmable and predictable operation of EFV 110.

According to aspects of at least one exemplary implementation, EFV 110 may be configured to respond to pressure and flow states thereof. For example, as shown in FIG. 5, spring 140 may cause stopper 142 to separate from mating surface 144, such that inlet 120 and outlet 130 are connected by a fluid path. The fluid path may include at least one opening 146 of stopper 142.

According to aspects of at least one exemplary implementation, openings 146 may be configured to allow a limited degree of fluid flow through at least a portion of stopper 142, such that a relatively higher pressure at inlet 120 is not fully relieved by fluid flow through openings 146. For example, pressure at inlet 120 may be suddenly high relative to pressure at outlet 130. In this condition, fluid flow through openings 146 may be insufficient to relieve the pressure, causing the remaining pressure to exert a force on a portion of stopper 142. The flow of fluid through openings 146 of EFV 110 may provide a frictional force in the direction of fluid flow. The force may cause spring 140 to compress, as shown in FIG. 6, whereby stopper 142 contacts mating surface 144.

According to aspects of at least one exemplary implementation, an interface between stopper 142 and mating surface 144 may cause EFV 110 to achieve a closed state, as shown in FIG. 6. The interface between stopper 142 and mating surface 144 may prevent or limit a fluid connection between inlet 120 and outlet 130.

According to aspects of at least one exemplary implementation, EFV 110 may be configured to provide efficient flow of fluid when fluid is provided in the opposite direction (into outlet 130 and out of inlet 120). For example, EFV 110 may be configured to limit flow in one direction and allow flow in the opposite direction.

According to aspects of at least one exemplary implementation, a closed state of EFV 110 may be reconciled to an open state as the flow is restricted between stopper 142 and mating surface 144. For example, as the gap between stopper 142 and mating surface 144 is decreased, the flow of fluid through openings 146 of stopper 142 also decreases. Thereby, a frictional force resulting from the flow is diminished. In a fully closed state, the frictional force may be eliminated where flow is ceased.

According to aspects of at least one exemplary implementation, EFV 110 may reach an equilibrium state in which forces due to pressure conditions, spring 140, and frictional forces from flow are balanced. According to aspects of at least one exemplary implementation, the equilibrium state may be one of or between the open state shown in FIG. 5 and the closed state shown in FIG. 6. An equilibrium state may be achieved according to selected configurations and features of EFV 110, such that flow rate may be regulated within desired parameters.

According to aspects of at least one exemplary implementation, the seal formed between stopper 142 and mating surface 144 may be complete or partial. Where a partial seal is formed, a small amount of flow may leak across the interface of stopper 142 and mating surface 144. If the pressure downstream (i.e., at outlet 130) is gradually increased due to the leak from inlet 120, the gap between stopper 142 and mating surface 144 will gradually increase; thus, EFV 110 will automatically recover to its open position. The timing from a closed state to an open state depends on the complete or partial nature of the seal, as well as the force provided by spring 140, inter alia. According to aspects of at least one exemplary implementation, EFV 110 may dampen impulse, without entirely stopping the flow for a long time period. Thus, EFV 110 may be used to protect against a surge or impulse in pressure or flow.

FIG. 8 shows a traditional bi-directional mechanization for a storage system for fluid (e.g., hydrogen). Fill line 20 provides a fluid (gas or liquid) to a point that diverts into two directions along spending line 24: one direction to storage tank 30 and another direction to regulator 40. This bi-directional mechanization has multiple advantages. For example, redundant tubing is avoided inasmuch as portions of spending line 24 are the same as portions of fill line 20. Thus, this mechanization provides minimal tubing connections and minimal joints for external leak.

According to aspects of at least one exemplary implementation, storage tank 30 is provided with appropriate control and regulation devices to manage the flow and conditions of fluid of storage tank 30. For example, check valve 22 is provided to permit flow of a fluid into storage tank 30 during a refill phase. Tank valve 32 may be provided at the entrance and exit line of storage tank 30. Tank valve 32 may be a solenoid valve or other valve to selectively control flow in and out of storage tank 30.

According to aspects of at least one exemplary implementation, active on tank device 31 may be associated with storage tank 30 for control and management of filling and discharge of storage tank 30. For example, as shown in FIG. 9, active on tank device 31 of storage tank 30 may include temperature sensor 34, distal pressure delayer 101, proximal pressure delayer 102, filter 36, manual valve 37, tank valve 32, thermal pressure relief device 38, defueling valve 39, and appropriate inlets and outlets.

According to aspects of at least one exemplary implementation, a bi-directional mechanization is shown in FIG. 10. According to aspects of at least one exemplary implementation, bi-directional mechanization systems may include one or more storage tanks 30. Systems may include one or more pressure delayers. Shown in FIG. 10 is a system having distal pressure delayer 101, proximal pressure delayer 102, and output pressure delayer 103. Each may be provided individually or in combination. According to aspects of at least one exemplary implementation, a pressure delayer may be an excess flow valve ("EFV"), as disclosed herein.

According to aspects of at least one exemplary implementation, a bi-directional mechanization may include pressure sensors, such as high pressure sensor 33 or low pressure sensor 42, to sense pressure at selectable locations within the system.

According to aspects of at least one exemplary implementation, one or more pressure delayers may protect tank valve 32 of a bi-directional mechanization. For example, distal pressure delayer 101 may be provided between fill line 20 and tank valve 32. Check valve 22 may be provided between fill line 20 and storage tank 30 to allow one-way access of a fluid into storage tank 30. As shown in FIG. 10, check valve 22 may be provided along a parallel path with respect to tank valve 32 and distal pressure delayer 101.

According to aspects of at least one exemplary implementation, during a refill phase, fluid from fill line 20 may eventually reach both upstream and downstream sides of tank valve 32. However, where the upstream side of tank valve 32 is reached by traveling through check valve 22 and through storage tank 30, the path to the upstream side of tank valve 32 is longer than the path to the downstream side of tank valve 32. Accordingly an uneven pressure differential may result across tank valve 32, as the fluid reaches the downstream side before reaching the upstream side. An uneven pressure differential across tank valve 32 may increase the energy requirements during operation (e.g., opening and closing) of tank valve 32 and decrease the operating life of tank valve 32.

According to aspects of at least one exemplary implementation, distal pressure delayer 101 protects tank valve 32 during a refill phase. An uneven pressure impulse on the downstream side of tank valve 32 is remedied by the operation of distal pressure delayer 101, which delays the flow of fluid across distal pressure delayer 101 according to flow and pressure conditions, as disclosed herein. This delay allows the downstream side of tank valve 32 to pressurize at a rate more consistent with the pressurization of the upstream side of tank valve 32. Thus, tank valve 32 is maintained at more balanced conditions.

According to aspects of at least one exemplary implementation, the balanced pressure conditions upstream and downstream tank valve 32 provide improved energy efficiency during operation of tank valve 32. Where the pressure differential is great across tank valve 32, the electrical energy required to open tank valve 32 may be great (e.g., where tank valve 32 is a solenoid valve). Where tank valve 32 is maintained in a balanced pressure condition, energy requirements are reduced, as is the need for additional components, such as a high current amplifier.

According to aspects of at least one exemplary implementation, proximal pressure delayer 102 protects tank valve 32. Proximal pressure delayer 102 may be provided between storage tank 30 and tank valve 32. Further, proximal pressure delayer 102 may be responsive to flow from storage tank 30 to tank valve 32.

According to aspects of at least one exemplary implementation, as refill of storage tank 30 starts, fluid flowing from fill line 20 may activate proximal pressure delayer 102 by frictional forces resulting when the flow rate through storage tank 30 is high. According to aspects of at least one exemplary implementation, such flow rates may occur during a refill phase. In such cases, proximal pressure delayer 102 provides protection to various downstream components (e.g., tank valve 32) from sudden pressure impulse out of fill line 20.

According to aspects of at least one exemplary implementation, as tank valve 32 opens, fluid flowing out of storage tank 30 may activate proximal pressure delayer 102 by frictional forces resulting when the flow rate from storage tank 30 is high. According to aspects of at least one exemplary implementation, such flow rates may occur during a discharge phase or upon line shearing within the system. In such cases, proximal pressure delayer 102 provides protection to various downstream components (e.g., tank valve 32) from sudden pressure drop at spending line 24, shown in FIG. 10.

According to aspects of at least one exemplary implementation, output pressure delayer 103 protects regulator 40. Output pressure delayer 103 may be provided between fill line 20 and regulator 40 and configured to be responsive to flow from fill line 20. For example, during a refill phase, fluid from fill line 20 may cause sudden pressure impulse in various components of the system, including regulator 40. Output pressure delayer 103 may dampen the sudden flow from fill line 20. With respect to regulator 200 and regulator 300, as shown in FIGS. 1 and 2, respectively, the reduction of sudden flow impulse may protect components thereof from damage-inducing impact.

According to aspects of at least one exemplary implementation, output pressure delayer 103 may also protect regulator 40 from sudden pressure impulse from other upstream sources, such as storage tank 30. For example, during a discharge phase, output pressure delayer 103 reduces sudden pressure and flow impulses occurring when tank valve 32 is opened.

Traditionally, regulators are not effective as sealing devices. A regulator's function is to control its downstream pressure in a flow condition. At no flow, the upstream pressure will gradually leak through the internal seat, resulting in a decrease of upstream pressure and an increase of downstream pressure. This phenomenon is known as "creep." Furthermore, regulators having more precise output regulation (e.g., +/0.1 Mpa) tend to be more sensitive to the sealing capabilities.

According to aspects of at least one exemplary implementation, creep of regulator 40, as shown in FIGS. 7 and 9, will cause the downstream pressure of tank valve 32 to be reduced, while its upstream pressure is maintained. Thus, a high differential will be established, requiring greater energy to operate tank valve 32.

According to aspects of at least one exemplary implementation, as shown in FIG. 11, mid-stage valve 152 may be provided between regulator 40 and supplemental regulator 154. Mid-stage valve 152 may be a fully sealable device that selectively prevents leaks. Mid-stage valve 152 may further help prevent creep across regulator 40 by maintaining the pressure between regulator 40 and mid-stage valve 152. With such features, mid-stage valve 152 may be provided with a low pressure differential for low energy requirements during operation. Likewise, mid-stage valve 152 may maintain a balanced pressure differential across tank valve 32 during a rest phase of the system.

According to aspects of at least one exemplary implementation, where regulator 40 effectively resists creep phenomena, as disclosed herein, a high pressure may be maintained between output pressure delayer 103 and regulator 40. Where output pressure delayer 103 has a high downstream pressure, it is less likely to achieve a fully closed state when tank valve 32 is opened. The pressure at its outlet may be sufficiently high such that output pressure delayer 103 maintains an open state because no sudden pressure or flow impulse causes a high differential of pressure across output pressure delayer 103. Thus, flow through output pressure delayer 103 during an equilibrium state or a steady-state phase does not unduly disrupt operation of the system.

According to aspects of at least one exemplary implementation, supplemental regulator 154 may be provided downstream of mid-stage valve 152. Because supplemental regulator 154 is downstream of mid-stage valve 152, it is not subject to continual pressure during a rest phase of the system. Thus, supplemental regulator 154 may have low resistance to creep without adversely affecting the system.

According to aspects of at least one exemplary implementation, variations are contemplated and considered within the present disclosure. Appendix A, showing a bi-directional mechanization system, is incorporated by reference, as if fully set forth herein.

According to aspects of at least one exemplary implementation, adequate control systems and devices may be provided in connection with relevant components to monitor the system, control operation thereof, and interface with a user or other systems. Such control systems may store, process, and communicate operation parameters, commands, data, and information relating to the system.

According to aspects of at least one exemplary implementation, any given device or component of the present disclosure may be provided in plurality through the system. For example, multiple valves, etc. may be provided in series or parallel to provide customizable results. By further example, multiple storage tanks 30 may be provided and connected to a common line leading to a destination.

Aspects of exemplary implementations disclosed herein are intended to be capable of combination, separation, and exchange with other aspects of exemplary implementations disclosed herein, except where expressly stated otherwise.

While the method and agent have been described in terms of what are presently considered to be the most practical and preferred exemplary implementations, it is to be understood that the disclosure need not be limited to the disclosed exemplary implementations. It is intended to cover various modifications and similar arrangements included within the spirit and scope of the claims, the scope of which should be accorded the broadest interpretation so as to encompass all such modifications and similar structures. The present disclosure includes any and all exemplary implementations of the following claims.

It should also be understood that a variety of changes may be made without departing from the essence of the invention. Such changes are also implicitly included in the description. They still fall within the scope of this invention. It should be understood that this disclosure is intended to yield a patent covering numerous aspects of the invention both independently and as an overall system and in both method and apparatus modes.

Further, each of the various elements of the invention and claims may also be achieved in a variety of manners. This disclosure should be understood to encompass each such variation, be it a variation of an exemplary implementation of any apparatus exemplary implementation, a method or process exemplary implementation, or even merely a variation of any element of these.

Particularly, it should be understood that as the disclosure relates to elements of the invention, the words for each element may be expressed by equivalent apparatus terms or method terms—even if only the function or result is the same.

Such equivalent, broader, or even more generic terms should be considered to be encompassed in the description of each element or action. Such terms can be substituted where desired to make explicit the implicitly broad coverage to which this invention is entitled.

It should be understood that all actions may be expressed as a means for taking that action or as an element which causes that action.

Similarly, each physical element disclosed should be understood to encompass a disclosure of the action which that physical element facilitates.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in at least one of a standard technical dictionary recognized by artisans and the Random House Webster's Unabridged Dictionary, latest edition are hereby incorporated by reference.

Finally, all referenced listed in the Information Disclosure Statement or other information statement filed with the application are hereby appended and hereby incorporated by reference; however, as to each of the above, to the extent that such information or statements incorporated by reference might be considered inconsistent with the patenting of this/these invention(s), such statements are expressly not to be considered as made by the applicant(s).

In this regard it should be understood that for practical reasons and so as to avoid adding potentially hundreds of claims, the applicant has presented claims with initial dependencies only.

Support should be understood to exist to the degree required under new matter laws—including but not limited to United States Patent Law 35 USC 132 or other such laws—to permit the addition of any of the various dependencies or other elements presented under one independent claim or concept as dependencies or elements under any other independent claim or concept.

To the extent that insubstantial substitutes are made, to the extent that the applicant did not in fact draft any claim so as to literally encompass any particular exemplary implementation, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative exemplary implementations.

Further, the use of the transitional phrase "comprising" is used to maintain the "open-end" claims herein, according to traditional claim interpretation. Thus, unless the context requires otherwise, it should be understood that the term "compromise" or variations such as "comprises" or "comprising", are intended to imply the inclusion of a stated element or step or group of elements or steps but not the exclusion of any other element or step or group of elements or steps.

Such terms should be interpreted in their most expansive forms so as to afford the applicant the broadest coverage legally permissible.

The invention claimed is:

1. A bi-directional system, comprising:
   a storage tank;
   a regulator;
   a spending line connecting the storage tank to the regulator;
   a fill line connected to the spending line;
   a check valve between the storage tank and the fill line and configured to allow flow into the storage tank;
   a tank valve between the storage tank and the fill line and in parallel with the check valve; and
   a distal pressure delayer having an inlet connected to the fill line and an outlet connected to the tank valve.

2. The system of claim 1, wherein the distal pressure delayer is configured to delay a flow of fluid through the distal pressure delayer when a flow impulse is provided to the inlet of the distal pressure delayer.

3. The system of claim 1, further comprising:
   a proximal pressure delayer valve having an inlet connected to the storage tank and an outlet connected to the tank valve.

4. The system of claim 3, wherein the proximal pressure delayer is configured to delay a flow of fluid through the proximal pressure delayer when a flow impulse is provided to the inlet of the proximal pressure delayer.

5. The system of claim 1, further comprising:
   an output pressure delayer having an inlet connected to the tank valve and an outlet connected to the regulator.

6. The system of claim 5, wherein the output pressure delayer is configured to delay a flow of fluid through the output pressure delayer when a flow impulse is provided to the inlet of the output pressure delayer.

7. The system of claim 1, further comprising:
   a mid-stage valve disposed downstream of the regulator.

8. A bi-directional system, comprising:
   a storage tank;
   a regulator;
   a spending line connecting the storage tank to the regulator;
   a fill line connected to the spending line;
   a check valve between the storage tank and the fill line and configured to allow flow into the storage tank;
   a tank valve between the storage tank and the fill line and in parallel with the check valve; and
   an output pressure delayer having an inlet connected to the tank valve and an outlet connected to the regulator.

9. The system of claim 8, wherein the output pressure delayer is configured to delay a flow of fluid through the output pressure delayer when a flow impulse is provided to the inlet of the output pressure delayer.

10. The system of claim 8, further comprising:
    a distal pressure delayer having an inlet connected to the fill line and an outlet connected to the tank valve.

11. The system of claim 10, wherein the distal pressure delayer is configured to delay a flow of fluid through the distal pressure delayer when a flow impulse is provided to the inlet of the distal pressure delayer.

12. The system of claim 8, further comprising:
    a proximal pressure delayer valve having an inlet connected to the storage tank and an outlet connected to the tank valve.

13. The system of claim 12, wherein the proximal pressure delayer is configured to delay a flow of fluid through the proximal pressure delayer when a flow impulse is provided to the inlet of the proximal pressure delayer.

14. The system of claim 8, further comprising:
    a mid-stage valve disposed downstream of the regulator.

15. A method of controlling fluid flow, comprising:
    during a refill phase, receiving a first flow impulse of a fluid from a fill line to a bi-directional spending line, whereby the first flow impulse is directed toward a tank valve of a storage tank and a regulator connected by the spending line;
    delaying the first flow impulse to the tank valve, wherein the tank valve is disposed between the fill line and a storage tank, whereby the fluid is substantially directed to the storage tank through a check valve connected to the storage tank in parallel with the tank valve; and
    delaying the first flow impulse to the regulator, whereby leakage of the regulator during the refill phase is reduced.

16. The method of claim 15, wherein delaying the first flow impulse to the tank valve further comprises: reducing a flow path in a distal pressure delayer in response to friction in the distal pressure delayer caused by the first flow impulse.

17. The method of claim 15, wherein delaying the first flow impulse to the regulator further comprises: reducing a flow path in an output pressure delayer in response to friction in the output pressure delayer caused by the first flow impulse.

18. The method of claim 15, further comprising:
    during a discharge phase, receiving a second flow impulse from the storage tank to the spending line; and
    delaying the second flow impulse to the regulator, whereby leakage of the regulator during the discharge phase is reduced.

19. The method of claim 18, wherein delaying the second flow impulse to the regulator further comprises: reducing a flow path in an output pressure delayer in response to friction in an output pressure delayer caused by the second flow impulse.

* * * * *